(12) United States Patent
Hakimi et al.

(10) Patent No.: US 12,400,077 B2
(45) Date of Patent: Aug. 26, 2025

(54) SYSTEM AND METHOD FOR IMPROVING UNDERSTANDING AND DECISION MAKING REGARDING STATISTICAL DATA

(71) Applicant: TOYOTA RESEARCH INSTITUTE, INC., Los Altos, CA (US)

(72) Inventors: Shabnam Hakimi, San Francisco, CA (US); Charlene C. Wu, San Francisco, CA (US); Matthew Len Lee, Mountain View, CA (US); Nikos Arechiga, San Mateo, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 434 days.

(21) Appl. No.: 17/499,794

(22) Filed: Oct. 12, 2021

(65) Prior Publication Data

US 2023/0116792 A1    Apr. 13, 2023

(51) Int. Cl.

| | | |
|---|---|---|
| G06F 40/279 | (2020.01) | |
| G06F 3/0481 | (2022.01) | |
| G06F 40/169 | (2020.01) | |
| G06T 11/60 | (2006.01) | |
| G06V 30/418 | (2022.01) | |
| G06V 30/14 | (2022.01) | |

(52) U.S. Cl.
CPC .......... G06F 40/279 (2020.01); G06F 3/0481 (2013.01); G06F 40/169 (2020.01); G06T 11/60 (2013.01); G06V 30/418 (2022.01); G06V 30/14 (2022.01)

(58) Field of Classification Search
CPC .... G06F 40/279; G06F 3/0481; G06F 40/169; G06F 40/30; G06T 11/60; G06V 30/413; G06V 30/14
See application file for complete search history.

(56) References Cited

U.S. PATENT DOCUMENTS

| | | |
|---|---|---|
| 8,447,066 B2 | 5/2013 | King et al. |
| 10,325,024 B2 | 6/2019 | Allen et al. |

(Continued)

FOREIGN PATENT DOCUMENTS

| | | |
|---|---|---|
| CN | 111221897 A | 6/2020 |
| DE | 102006024153 A1 | 11/2007 |
| JP | 2005135378 A | 5/2005 |

OTHER PUBLICATIONS

Dippo, Cathryn S., "The role of metadata in statistics", (https://www.bls.gov/osmr/research-papers/2000/pdf/st000040.pdf), Jun. 1, 2021.

*Primary Examiner* — Hope C Sheffield
(74) *Attorney, Agent, or Firm* — SEYFARTH SHAW LLP

(57) ABSTRACT

A method for statistical data clarification is described. The method includes determining a relevance of statistical data according to a textual context of a statistical data detected within a document viewed by a user. The method also includes establishing a frame of reference for the statistical data according to the textual context and a determined relevance of the statistical data detected within the document viewed by the user. The method further includes generating, according to the frame of reference, at least one analogy that corresponds to the statistical data. The method also includes displaying the at least one analogy to the user to assist the user in understanding and using the statistical data.

20 Claims, 6 Drawing Sheets

(56) References Cited

U.S. PATENT DOCUMENTS

| | | | |
|---|---|---|---|
| 2009/0265338 A1* | 10/2009 | Kraft | G06F 16/951 |
| | | | 707/999.005 |
| 2014/0281874 A1* | 9/2014 | Hofman | G06F 16/9038 |
| | | | 715/230 |
| 2017/0161619 A1 | 6/2017 | Franceschini et al. | |
| 2018/0150451 A1* | 5/2018 | Allen | G06N 20/00 |
| 2019/0072968 A1* | 3/2019 | Will, IV | G06N 3/006 |
| 2019/0197168 A1* | 6/2019 | Sylvester, II | G06F 16/248 |
| 2019/0295184 A1 | 9/2019 | Gray | |
| 2019/0333109 A1* | 10/2019 | Teller | G06Q 30/0267 |
| 2021/0295441 A1* | 9/2021 | Mullen | G08G 1/205 |

\* cited by examiner

SYSTEM AND METHOD FOR IMPROVING UNDERSTANDING AND DECISION MAKING REGARDING STATISTICAL DATA

BACKGROUND

Field

Certain aspects of the present disclosure generally relate to machine assisted cognition and, more particularly, to a system and method for improving understanding and decision making regarding statistical data.

Background

As background, currently established statistical data (e.g., probabilities, means, margins of error) appear in everything from news and popular media to insurance policies. Despite the prevalence of such statistical data, individuals typically lack the training to interpret statistical values in context and in a way that is useful for decision making. Furthermore, users may have internal biases that impact the way they interpret statistical information. Unfortunately, these biases in the interpretation of statistical data are not always obvious to a user. In addition, programs for creating statistical data typically cannot recognize these biases.

This noted lack of training regarding statistical data can lead to suboptimal decision making through multiple mechanisms, including exacerbating well-known biases in decision making, such as overestimating small probabilities. As a result, a system for determining the relevance of statistical information within a given textual context and establishing an appropriate frame of reference by generating meaningful analogies to help individuals understand and use the statistical data, is desired.

SUMMARY

A method for statistical data clarification is described. The method includes determining a relevance of statistical data according to a textual context of a statistical data detected within a document viewed by a user. The method also includes establishing a frame of reference for the statistical data according to the textual context and a determined relevance of the statistical data detected within the document viewed by the user. The method further includes generating, according to the frame of reference, at least one analogy that corresponds to the statistical data. The method also includes displaying the at least one analogy to the user to assist the user in understanding and using the statistical data.

A non-transitory computer-readable medium having program code recorded thereon for statistical data clarification described. The program is executed by a processor. The non-transitory computer-readable medium includes program code to determine a relevance of statistical data according to a textual context of the statistical data detected within a document viewed by a user. The non-transitory computer-readable medium also includes program code to establish a frame of reference for the statistical data according to the textual context and a determined relevance of the statistical data detected within the document viewed by the user. The non-transitory computer-readable medium further includes program code to generate, according to the frame of reference, at least one analogy that corresponds to the statistical data. The non-transitory computer-readable medium also includes program code to display the at least one analogy to the user to assist the user in understanding and using the statistical data.

A system for statistical data clarification is described. The system includes a statistical data detection module including a context analyzer to determine a relevance of statistical data according to a textual context of the statistical data detected within a document viewed by a user by the statistical data detection module. The system also includes a statistical inference model to establish a frame of reference for the statistical data according to the textual context and a determined relevance of the statistical data detected within the document viewed by the user. The system further includes an analogy generation engine to generate, according to the frame of reference, at least one analogy that corresponds to the statistical data. The system also includes a statistical analogy display module to display the at least one analogy to the user to assist the user in understanding and using the statistical data.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
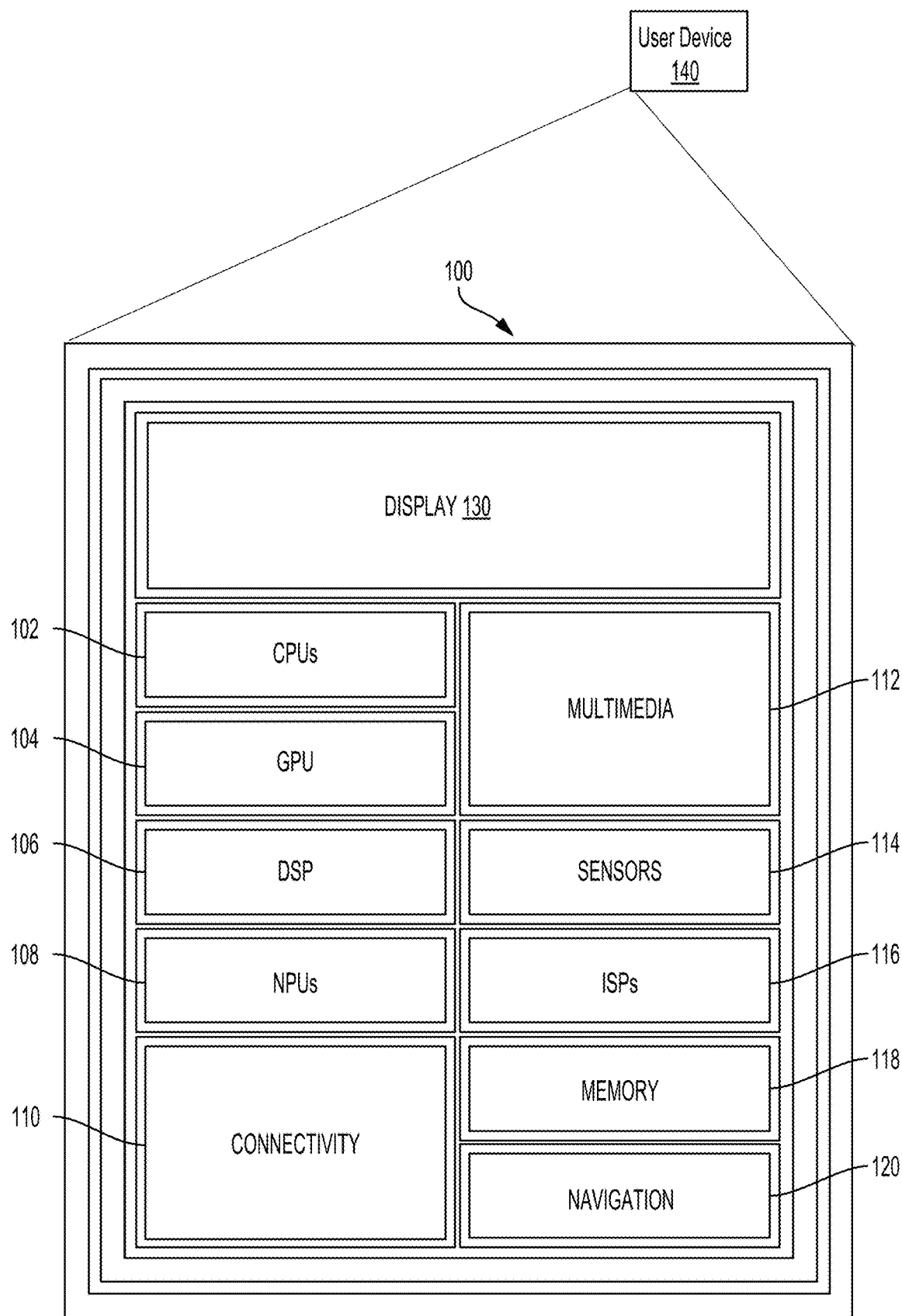
FIG. 1 illustrates an example implementation of designing a neural network using a system-on-a-chip (SOC) of a statistical data clarification system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

As background, currently established statistical data (e.g., probabilities, means, margins of error) appear in everything from news and popular media to insurance policies. Despite the prevalence of such statistical data, individuals typically lack the training to interpret statistical values in context and in a way that is useful for decision making. Furthermore, users may have internal biases that impact the way they interpret statistical information. Unfortunately, these biases in the interpretation of statistical data are not always obvious to a user. In addition, programs for creating statistical data typically cannot recognize these biases.

This noted lack of training regarding statistical data can lead to suboptimal decision making through multiple mechanisms, including exacerbating well-known biases in decision making, such as overestimating small probabilities. As a result, a system for determining the relevance of statistical information within a given textual context and establishing an appropriate frame of reference by generating meaningful analogies to help individuals understand and use the statistical data, is desired.

Aspects of the present disclosure are directed to a system and method for improving user understanding and decision making regarding statistical data. In some aspects of the present disclosure, a statistical data clarification method determines the relevance of statistical data within a given textual context. Once determined, the statistical data clarification method establishes an appropriate frame of reference of the statistical data by generating meaningful analogies to help a user understand and apply the statistical data. In some aspects of the present disclosure, a statistical data clarification system includes a processor unit, a memory component, a database, and a display unit. In some aspects of the present disclosure, the memory component is configured with logic modules, including (1) models for training a user in statistical inference; (2) a statistical data detector module; (3) a context analyzer module; (4) an analogy generation engine; and (5) an analogy presentation interface. In one configuration, the database stores data related to each of these logic modules and the display unit may output, as a user interface, the determined analogy to assist the user in understanding the statistical data.

FIG. 1 illustrates an example implementation of the aforementioned system and method for a statistical data clarification system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 may include code to clarify statistical data for improved understanding and application of the statistical data by a user. The instructions loaded into a processor (e.g., CPU 102) may also include code to determine a relevance of statistical data according to a textual context of the statistical data detected within a document viewed by a user. The instructions loaded into the processor (e.g., CPU 102) may also include code to establish a frame of reference for the statistical data according to the textual context and the relevance of the statistical data detected within the document viewed by the user. The instructions loaded into the processor (e.g., CPU 102) may also include code to generate, according to the frame of reference, at least one analogy that corresponds to the statistical data. The instructions loaded into the processor (e.g., CPU 102) may also include code to display the at least one analogy to the user to assist the user in understanding and using the statistical data.

Figure 2:
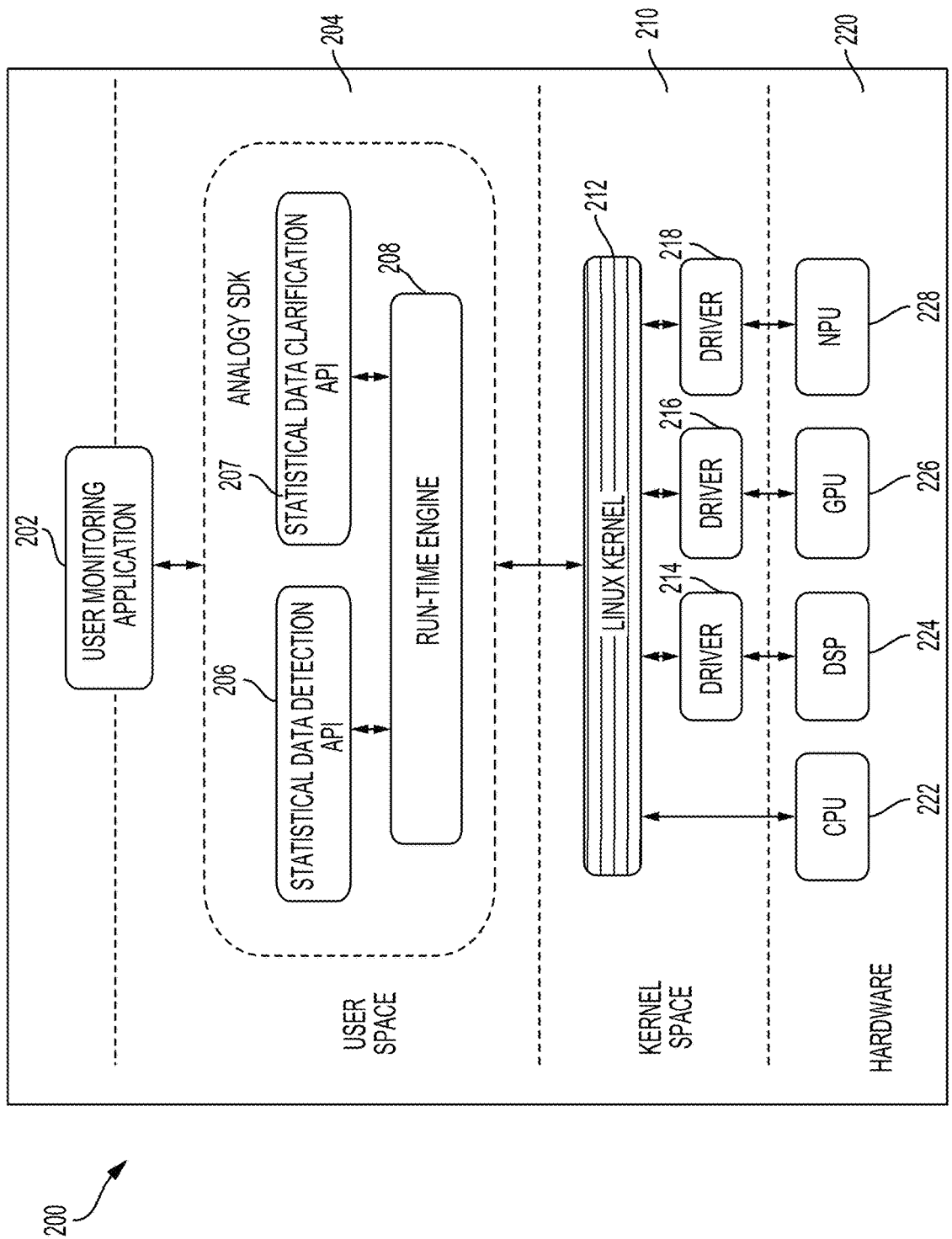
FIG. 2 is a block diagram illustrating an exemplary software architecture that may modularize artificial intelligence (AI) functions for a statistical data clarification system, according to aspects of the present disclosure.

FIG. 2 is a block diagram illustrating a software architecture 200 that may modularize artificial intelligence (AI) functions for a statistical data clarification system, according to aspects of the present disclosure. Using the architecture, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for statistical data clarification. It should be recognized that the statistical data clarification system is not limited to statistical data. According to aspects of the present disclosure, the user monitoring and the statistical data clarification functionality is applicable to any type of decision or user activity.

The user monitoring application 202 may be configured to call functions defined in a user space 204 that may, for example, provide statistical data clarification services. The user monitoring application 202 may make a request for compiled program code associated with a library defined in a statistical data detection application programming interface (API) 206. The statistical data detection API 206 is configured to detect statistical data presented to a user. In response, compiled program code of a statistical data clarification API 207 is configured to generate at least one analogy to clarify the detected statistical data. In addition, the statistical data clarification API 207 is configured to display the at least one analogy to the user to assist the user in understanding and applying the statistical data.

A run-time engine 208, which may be compiled code of a run-time framework, may be further accessible to the user monitoring application 202. The user monitoring application 202 may cause the run-time engine 208, for example, to take actions for providing statistical data analogies in response to detecting statistical data presented to a user. In response to detection of the statistical data, the run-time engine 208 may in turn send a signal to an operating system 210, such as a Linux Kernel 212, running on the SOC 220. FIG. 2 illustrates the Linux Kernel 212 as software architecture for statistical data clarification. It should be recognized, however, that aspects of the present disclosure are not limited to this exemplary software architecture. For example, other kernels may provide the software architecture to support the statistical data clarification functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Statistical data (e.g., probabilities, means, margins of error) is prevalent in everything from news and popular media to insurance policies. Despite the prevalence of such statistical data, individuals typically lack the training to interpret statistical values in context and in a way that is useful for decision making. Furthermore, users may have internal biases that impact the way they interpret statistical information. This lack of training regarding statistical data can lead to suboptimal decision making through multiple mechanisms, including exacerbating well-known biases in decision making, such as overestimating small probabilities.

Aspects of the present disclosure are directed to a system and method for improving user understanding and decision making regarding statistical data. In some aspects of the present disclosure, a statistical data clarification method determines the relevance of statistical data within a given textual context. Once determined, the statistical data clarification method establishes an appropriate frame of reference of the statistical data by generating meaningful analogies to help a user understand and apply the statistical data.

Figure 3:
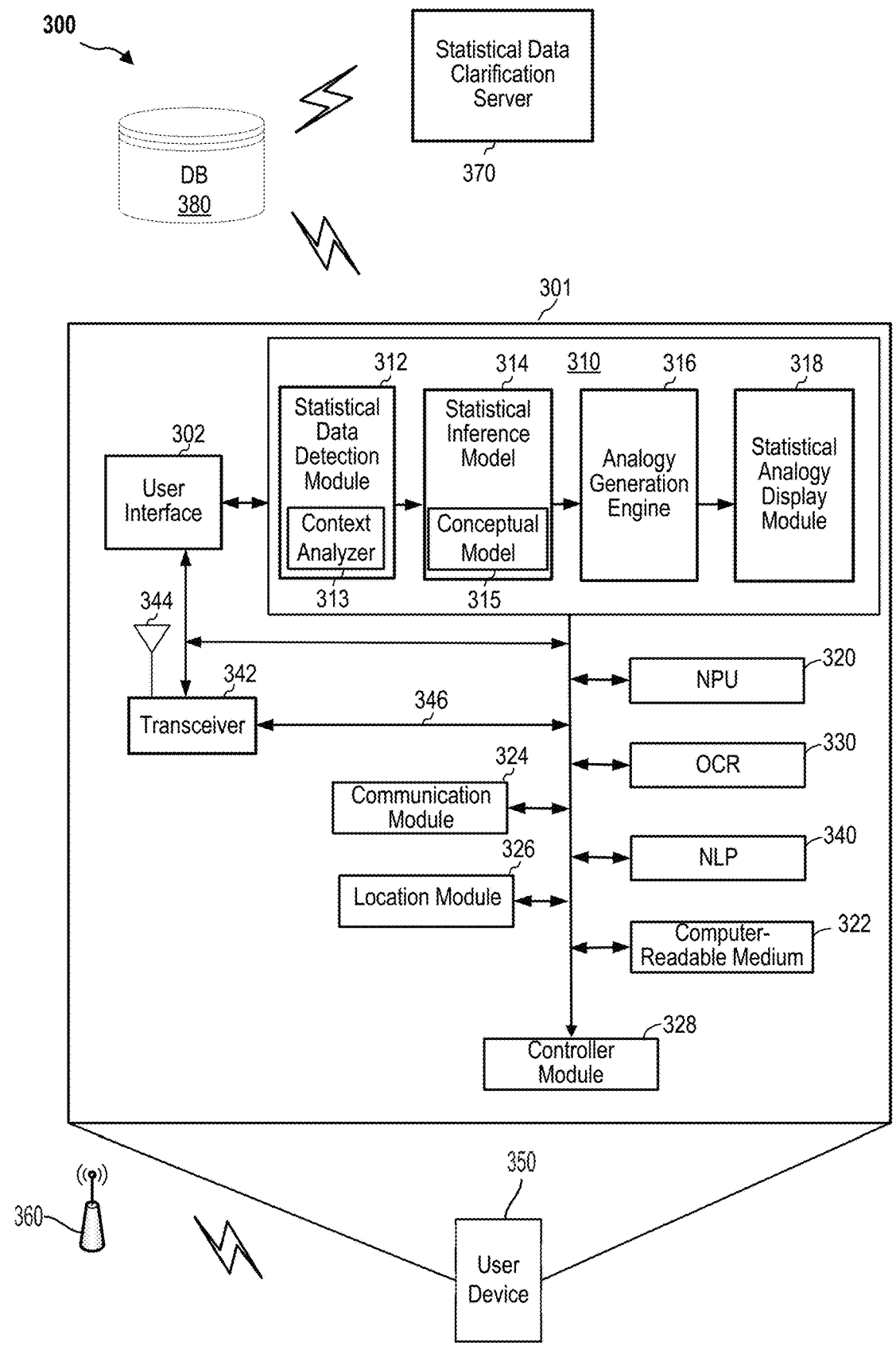
FIG. 3 is a diagram illustrating a hardware implementation for a statistical data clarification system, according to aspects of the present disclosure.

FIG. 3 is a diagram illustrating a hardware implementation for a statistical data clarification system 300, according to aspects of the present disclosure. The statistical data clarification system 300 may be configured to clarify statistical data presented to a user. The statistical data clarification system 300 is configured to determine a relevance of statistical data according to a textual context of the statistical data detected within a document viewed by a user. The statistical data clarification system 300 is also configured to establish a frame of reference for the statistical data according to the textual context and the relevance of the statistical data detected within the document viewed by the user. In response, statistical data clarification system 300 is to generate, according to the frame of reference, at least one analogy that corresponds to the statistical data. In addition, the statistical data clarification system 300 is also configured to display the at least one analogy to the user to assist the user in understanding and using the statistical data.

The statistical data clarification system 300 includes a user monitoring system 301 and a statistical data clarification server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The statistical data clarification server 370 may connect to the user device 350 for monitoring statistical data presented to the user to determine whether the statistical data involves clarification. For example, the statistical data clarification server 370 may determine a relevance of statistical data according to a textual context of the statistical data detected within a document viewed by a user. The statistical data clarification server 370 may also establish a frame of reference for the statistical data according to the textual context and the relevance of the statistical data detected within the document viewed by the user. The statistical data clarification server 370 may also generate, according to the frame of reference, at least one analogy that corresponds to the statistical data. The statistical data clarification server 370 may transmit the at least one analogy to the user device 350 for displaying the at least one analogy to assist the user in understanding and using the statistical data.

The user monitoring system 301 may be implemented with an interconnected architecture, represented generally by an interconnect 346. The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a controller module 328, an optical character recognition (OCR) 330, and a natural language processor (NLP) 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the controller module 328, the OCR 330, and NLP 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the user activity module 310 to/from connected devices within the vicinity of the user device 350.

The user monitoring system 301 includes the NPU 320, the OCR 330, and the NLP 340 coupled to the computer-readable medium 322. The NPU 320, the OCR 330, and NLP 340 performs processing, including the execution of software stored on the computer-readable medium 322 to provide a neural network model for user monitoring and statistical data clarification functionality according to the present disclosure. The software, when executed by the NPU 320, the OCR 330 and the NLP 340, causes the user monitoring system 301 to perform the various functions described for presenting analogies to clarify statistical data presented to the user through the user device 350, or any of the modules (e.g., 310, 324, 326, 330, and/or 340). The computer-readable medium 322 may also be used for storing data that is manipulated by the OCR 330 and the NLP 340 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the OCR 330 and the NLP 340 to automatically detect statistical data (e.g., probabilities, means, and/or margins of error) to enable clarification of statistical data. The user monitoring system 301 may follow a process to detect and determine whether statistical data is presented to the user. When the user monitoring system 301 has access to a document object model (DOM) (e.g., on a web page or embedded in an application), the user monitoring system 301 may detect statistical data. When no object model is available, the user monitoring system 301 may use the OCR 330 and the NLP 340 to automatically detect statistical data.

The user activity module 310 may be in communication with the user interface 302, the NPU 320, the computer-readable medium 322, the communication module 324, the location module 326, the controller module 328, the OCR 330, the NLP 340, and the transceiver 342. In one configuration, the user activity module 310 monitors communications from the user interface 302. The user interface 302 may monitor user communications to and from the communication module 324. According to aspects of the present disclosure, the OCR 330 and the NLP 340 automatically detect statistical data and may use computer vision techniques to automatically detect the statistical data.

As shown in FIG. 3, the user activity module 310 includes a statistical data detection module 312, a statistical inference model 314, an analogy generation engine 316, and a statistical analogy display module 318. The statistical data detection module 312, the statistical inference model 314, the analogy generation engine 316, and the statistical analogy display module 318 may be components of a same or different artificial neural network, such as a deep convolutional neural network (CNN). The statistical inference model 314 is not limited to a CNN. The user activity module 310 monitors and analyzes statistical data received from the user interface 302.

The statistical data clarification server 370 may determine a relevance of statistical data according to a textual context of the statistical data detected within a document viewed by a user. The statistical data clarification server 370 may also establish a frame of reference for the statistical data according to the textual context and the relevance of the statistical data detected within the document viewed by the user. The statistical data clarification server 370 may also generate, according to the frame of reference, at least one analogy that corresponds to the statistical data. The statistical data clarification server 370 may transmit the at least one analogy to the user device 350 for displaying the at least one analogy to assist the user in understanding and using the statistical data.

This configuration of the user activity module 310 includes the statistical data detection module 312 configured to detect statistical data presented to a user. In some aspects of the present disclosure, the statistical data detection module 312 uses the OCR 330 and the NLP 340 to search text viewed by the user for statistical data. For example, the statistical data detection module 312 scans the viewed text for a combination of numerical characters and/or words representing numbers as well as terms related to statistics. The terms related to statistics may include such terms as 'probability,' 'percent,' 'rate,' 'mean,' 'median,' and/or 'error.'

In some aspects of the present disclosure, the statistical data detection module 312 includes a context analyzer 313 to identify the context in which the statistical data appears in the text viewed by the user. Depending on the context, the statistical data can have very different meanings with different implications for user understanding and decision making. In these aspects of the present disclosure, the context analyzer 313 uses a tuned natural language processing algorithm (e.g., using the NLP 340) to determine the topic and sentiment of the article and the context where the statistical data appears. The context analyzer 313 may be implemented using a tuned natural language processing algorithm, such as a topic modeling approach and/or sentiment analysis. The context analyzer 313 may also recognize whether a given piece of statistical data is related to other statistical data within the text viewed by the user. In particular, the context analyzer 313 establishes a frame of reference for the statistical data according to the textual context and the relevance of the statistical data detected within the document viewed by the user.

In addition, the user activity module 310 includes the statistical inference model 314 configured to determine a relevance of statistical data according to a textual context and the relevance of the statistical data detected within a document viewed by the user by the context analyzer 313. In some aspects of the present disclosure, the statistical inference model 314 provides a framework for training the user in statistical inference using a conceptual model 315 that outlines how individuals learn to understand and make inferences from statistical data over time. For example, the statistical inference model defines an optimal relationship between the detected statistical data in context and analogies that are useful to understanding and learning. The statistical inference model 314 may rely on a predefined set of easy-to-relate statistics gathered from studies (e.g., 'twice as likely as getting into a car accident' or 'equal to winning the jackpot of your state lottery') as the basis for analogies. Alternatively, the statistical inference model 314 may rely on categories or examples of statistics from content previously viewed by the user, with the assumption that users may be more familiar with statistics they have frequently encountered.

In these aspects of the present disclosure, the user activity module 310 includes the analogy generation engine 316 configured to generate, according to the frame of reference, at least one analogy that corresponds to the statistical data. In some aspects of the present disclosure, the analogy generation engine 316 is configured to apply the statistical inference model 314. For example, the analogy generation engine 316 applies the framework provided by the statistical inference model 314 and the conceptual model 315 to interpret the context in which the statistical data appears.

Once the context is interpreted, the analogy generation engine 316 determines the appropriate analogy for presenting to the user. For example, the appropriate analogy is preferably similar to the currently detected statistical data. The analogy generation engine 316 is further configured to output the analogy in a pre-specified format.

In addition, the user activity module 310 includes the statistical analogy display module 318 to display the at least one analogy to assist the user in understanding and using the statistical data. In some aspects of the present disclosure, the statistical analogy display module 318 is a presentation interface component that displays the output of the analogy generation engine 316 to the user. For example, the statistical analogy display module 318 includes a link to additional information about the content in the analogy. In this example, the display of the statistical analogy display module 318 automatically appears in the margin next to the statistical data. In response, the user can choose to interact with the statistical analogy display module 318, if desired.

In some aspects of the present disclosure, the user activity module 310 may be implemented and/or work in conjunction with the statistical data clarification server 370. In one configuration, a database (DB) 380 stores data related to each of these logic modules and the display unit may output, as the user interface 302, the determined analogy to assist the user in understanding the statistical data. In some aspects of the present disclosure, the statistical data clarification system 300 may include a web browser plugin. In other aspects of the present disclosure, the statistical data clarification server 370 provides an offline application that scans downloaded articles or documents related to the currently viewed document. In other aspects of the present disclosure, the statistical data clarification system 300 may include a mobile application that scans content/text displayed on the user interface 302 to display a determined analogy to assist the user in understanding statistical data in a viewed document, for example, as shown in FIG. 4.

Figure 4:
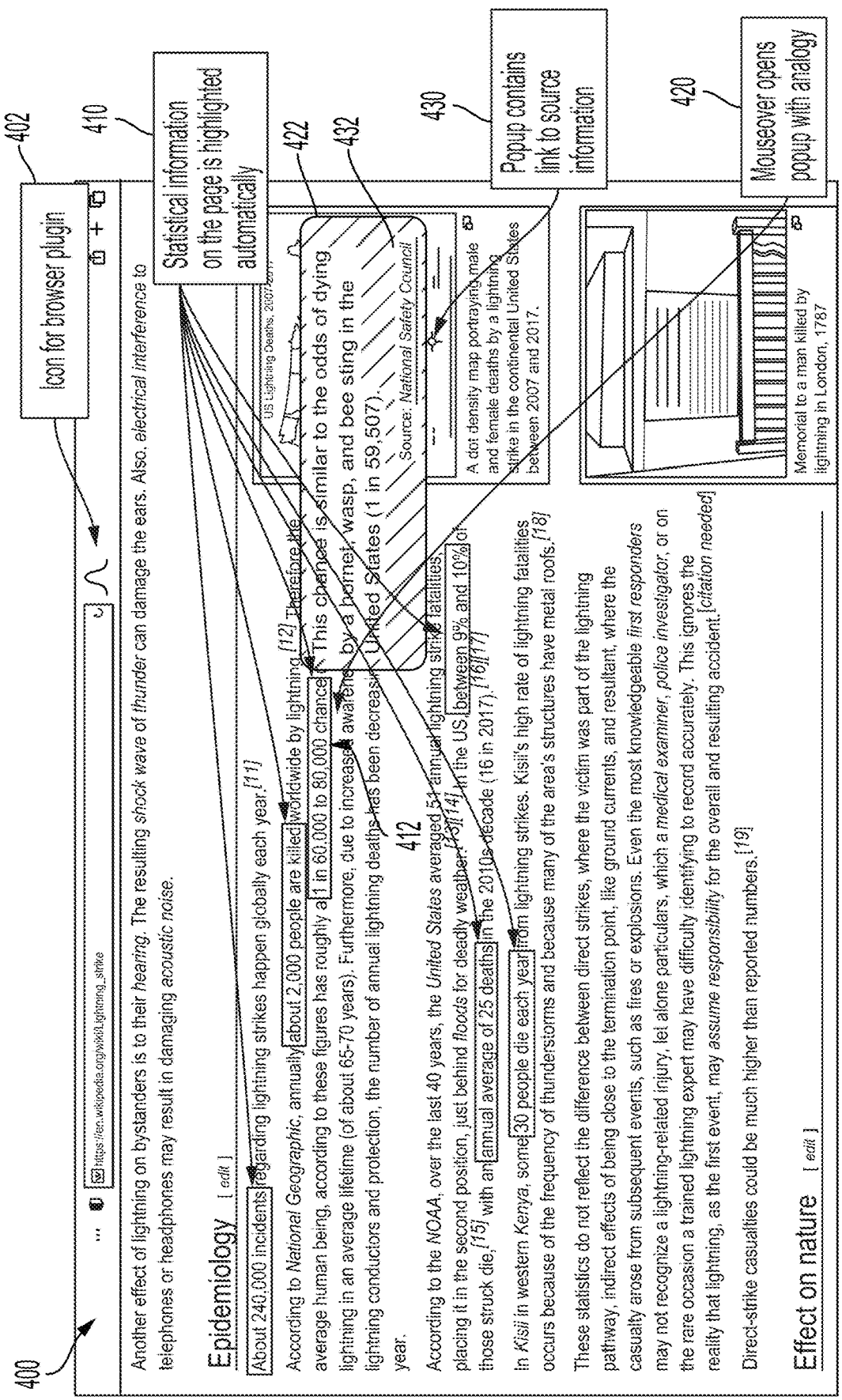
FIG. 4 is a display screen illustrating a statistical data clarification system process, in accordance with aspects of the present disclosure.

FIG. 4 is a display screen illustrating a statistical data clarification system process, in accordance with aspects of the present disclosure. In some aspects of the present disclosure, a statistical data clarification process is applied to a webpage 400 viewed by a user to automatically detect statistical data at block 410 in response to clicking on a browser plugin icon at block 402. For example, the statistical data may include numerical data, probabilities, means, margins of error, numerical ratios, and other like statistical information. In this example, the statistical data regarding lightning strikes is automatically highlighted in response to clicking on the browser plugin icon at block 402.

As shown in FIG. 4, a statistical numerical ratio 412 is highlighted at block 410. In this example, the statistical numerical ratio 412 indicates a 1 in 60,000 to 80,000 chance of being struck by lightning. At block 420, the user's mouse hovers over the statistical numerical ratio 412, which opens a popup message 422, including a generated analogy to help explain the statistical numerical ratio 412 to the user. In this example, the popup message 422 provides an analogy indicating: "This chance is similar to the odds of dying by a hornet, wasp, and bee sting in the United States (1 in 59,507)." At block 430, the popup message 422 is provided with a link 432 to source information supporting the analogy.

Figure 5:
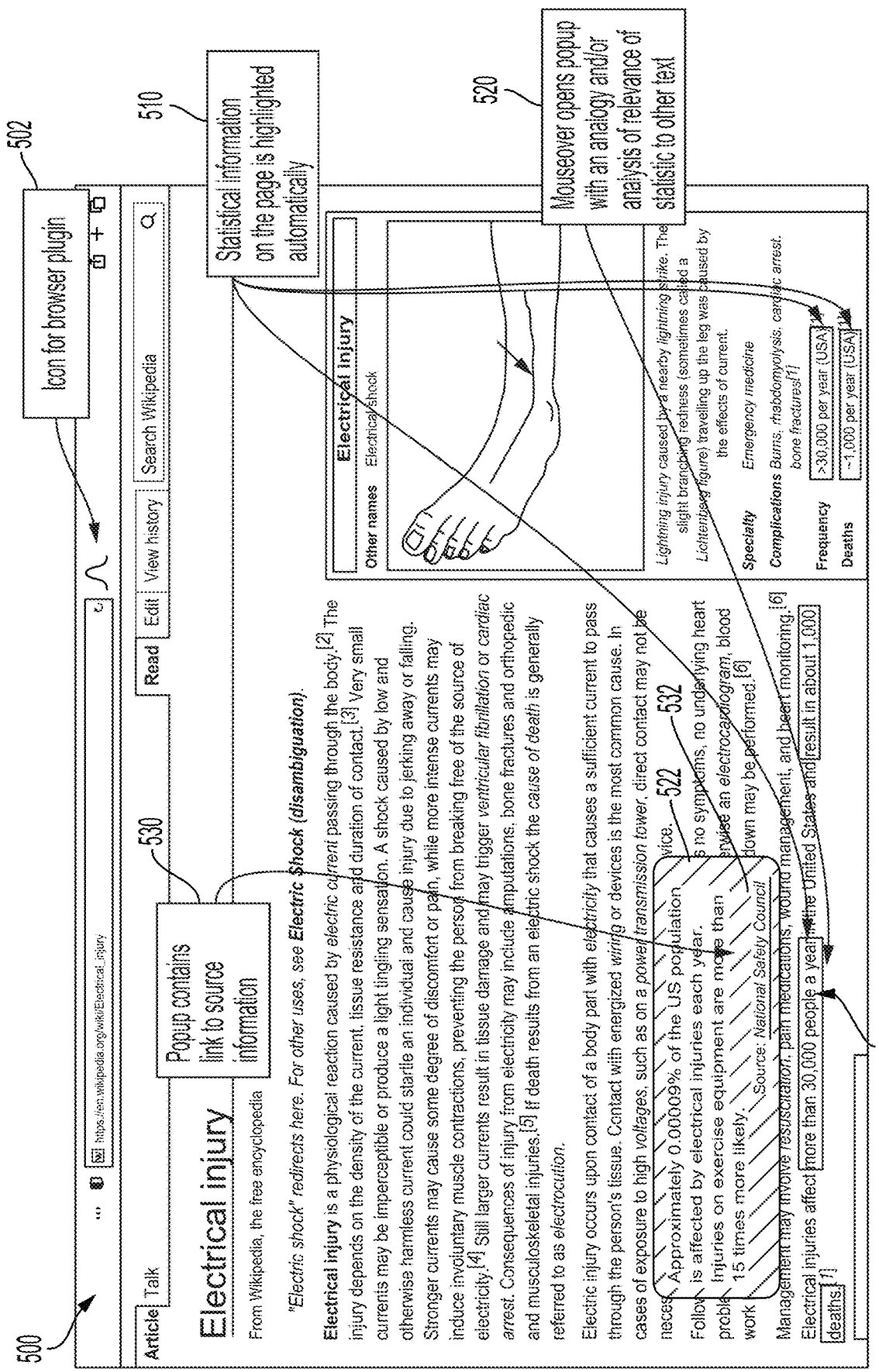
FIG. 5 is a display screen illustrating a statistical data clarification system process, in accordance with aspects of the present disclosure.

FIG. 5 is a display screen illustrating a statistical data clarification system process, in accordance with aspects of the present disclosure. In some aspects of the present disclosure, a statistical data clarification process is applied to a webpage 500 viewed by a user to automatically detect statistical data at block 510 in response to clicking on a browser plugin icon at block 502. In this example the statistical data also include numerical data, probabilities, means, margins of error, numerical ratios, and other like statistical information. In this example, the statistical data regarding electric shock is automatically highlighted at block 510 in response to clicking the browser plugin icon at block 502.

As shown in FIG. 5, a statistical numerical ratio 512 is highlighted at block 510. In this example, the statistical numerical ratio 512 indicates electrical injuries affect more than 30,000 people a year. At block 520, the user's mouse hovers over the statistical numerical ratio 512, which opens a popup message 522, including a generated analogy and/or analysis of relevance of the statistics to other text for helping explain the statistical numerical ratio 512 to the user. In the example, the popup message 522 provides an analogy indicating: "Approximately 0.00009% of the US population is affected by electrical injuries each year. Injuries on exercise equipment are more than 15 times more likely." At block 530, the popup message 522 is provided with a link 532 to source information supporting the analogy and/or the analysis of the relevance of the statistical data. A statistical data clarification system may engage in a process, for example, as shown in FIG. 6.

Figure 6:
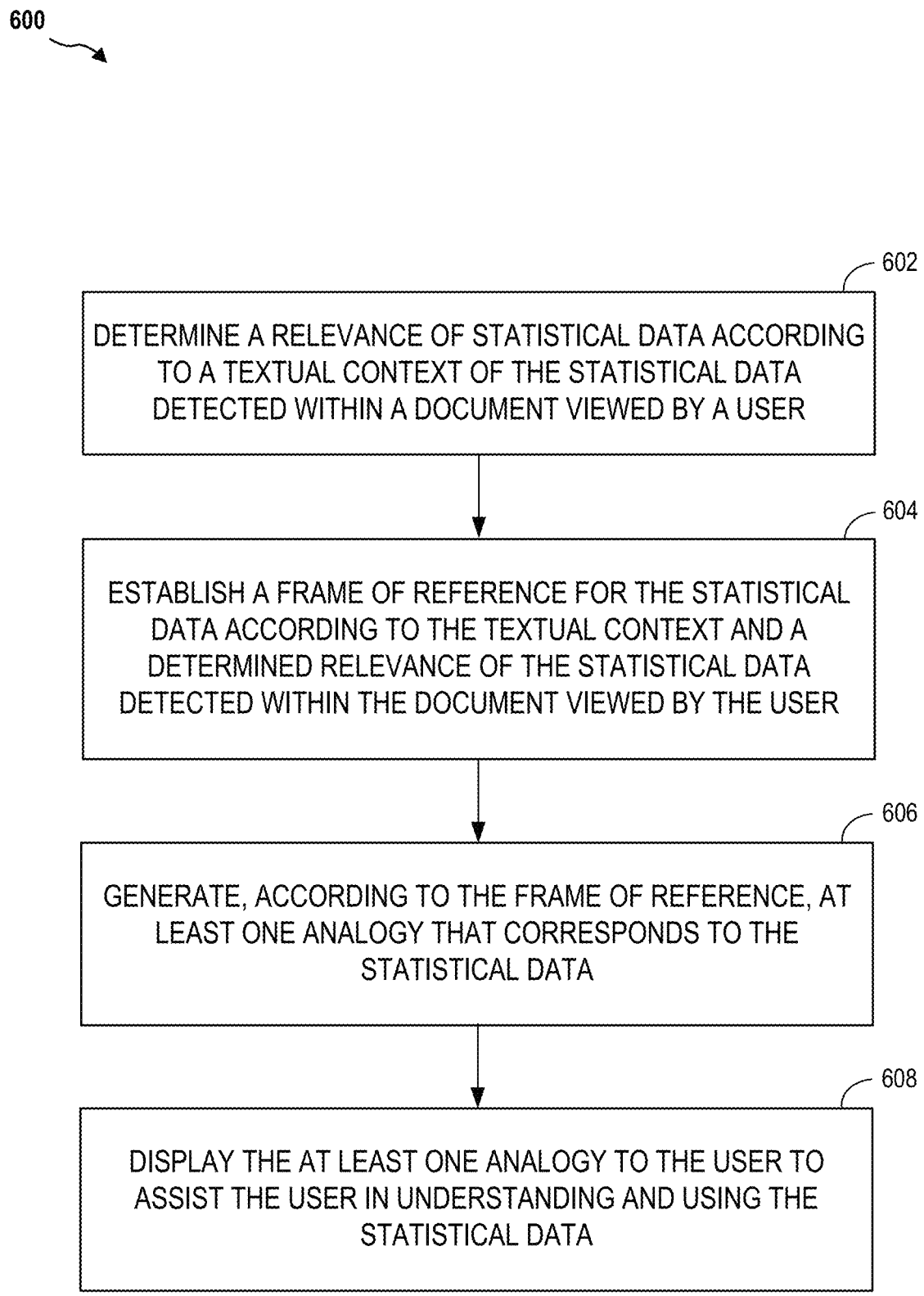
FIG. 6 is a flowchart illustrating a method for statistical data clarification, according to aspects of the present disclosure.

FIG. 6 is a flowchart illustrating a method for statistical data clarification, according to aspects of the present disclosure. A method 600 of FIG. 6 begins at block 602, in which a relevance of statistical data is determined according to a textual context of the statistical data detected within a document viewed by a user. For example, as described in FIG. 4, the statistical data clarification process is applied to a webpage 400 viewed by a user to automatically detect statistical data at block 410 in response to clicking on a browser plugin icon at block 402. For example, the statistical data may include numerical data, probabilities, means, margins of error, numerical ratios, and other like statistical information. In this example, the statistical data regarding lightning strikes is automatically highlighted. As shown in FIG. 5, the statistical data regarding electric shock is automatically highlighted at block 510 in response to clicking the browser plugin icon at block 502.

Referring again to FIG. 6, at block 604, a frame of reference is established for the statistical data according to the textual context and a determined relevance of the statistical data detected within the document viewed by the user. For example, as shown FIG. 3, the statistical inference model 314 determines a relevance of statistical data according to a textual context, and the relevance of the statistical data detected within a document viewed by the user is determined by the context analyzer 313. The statistical inference model 314 provides a framework for training the user in statistical inference using the conceptual model 315 for outlining how individuals learn to understand and make inferences from statistical data over time. For example, the statistical inference model 314 defines an optimal relationship between the detected statistical data in context and analogies that are useful to understanding and learning. The statistical inference model 314 may rely on statistics gathered from studies as the basis for analogies. Alternatively, the statistical inference model 314 may rely on categories or examples of statistics from content previously viewed by the user, with the assumption that users may be more familiar with statistics they have frequently encountered.

At block 606, at least one analogy that corresponds to the statistical data is generated according to the frame of reference. For example, as shown in FIG. 4, a statistical numerical ratio 412 is highlighted at block 410. In this example, the statistical numerical ratio 412 indicates a 1 in 60,000 to 80,000 chance of being struck by lightning. At block 420, the user's mouse hovers over the statistical numerical ratio 412, which opens a popup message 422, including a generated analogy to help explain the statistical numerical ratio 412 to the user. As shown in FIG. 5, a statistical numerical ratio 512 is highlighted at block 510. In this example, the statistical numerical ratio 512 indicates electrical injuries affect more than 30,000 people a year. At block 520, the user's mouse hovers over the statistical numerical ratio 512, which opens a popup message 522, including a generated analogy and/or analysis of relevance of the statistics to other text for helping explain the statistical numerical ratio 512 to the user.

Referring again to FIG. 6, at block 608, the at least one analogy is displayed to the user to assist the user in understanding and using the statistical data. For example, as shown in FIG. 4, the popup message 422 provides the analogy indicating: "This chance is similar to the odds of dying by a hornet, wasp, and bee sting in the United States (1 in 59,507)." At block 430, the popup message 422 is provided with the link 432 to source information supporting the analogy. As shown in FIG. 5, the popup message 522 provides the analogy indicating: "Approximately 0.00009% of the US population is affected by electrical injuries each year. Injuries on exercise equipment are more than 15 times more likely." In addition, the popup message 522 is provided with the link 532 to source information supporting the analogy and/or the analysis of the relevance of the statistical data.

The method 600 may also include identifying a context in which the statistical data appears in the text using a natural language processing algorithm. The method 600 may also include determining whether the statistical data is related to another statistical data within the text. The method 600 may further include detecting a user mouse over a highlighted statistical data within the document viewed by the user. The method 600 may also include overlaying the at least one analogy on the document viewed by the user and proximate to the highlighted statistical data within the document viewed by the user.

Aspects of the present disclosure are directed to a system and method for improving user understanding and decision making regarding statistical data. In some aspects of the present disclosure, a statistical data clarification method determines the relevance of statistical data within a given textual context. Once determined, the statistical data clarification method establishes an appropriate frame of reference of the statistical data by generating meaningful analogies to help a user understand and apply the statistical data. In some aspects of the present disclosure, a statistical data clarification system includes a model for training a user in statistical inference; a statistical data detector module, a context analyzer module, an analogy generation engine, and an analogy presentation interface. In one configuration, a database stores data related to each of these logic modules and a display unit may output, as a user interface, the determined analogy to assist the user in understanding the statistical data.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for statistical data clarification, comprising:
   determining a relevance and a textual context of a statistical data detected within a document viewed by a user;
   establishing, using a statistical inference model, a frame of reference for the statistical data according to the textual context and a determined relevance of the statistical data using categories and examples of statistics from content previously viewed by the user;
   generating, according to the frame of reference and the categories and the examples of statistics from the content viewed by the user, at least one statistical data analogy and an analysis of the statistical data that clarifies the statistical data, in which the categories and examples of statistics comprise a likelihood ratio of a human injury and/or human fatality having equivalent odds of occurring relative to the statistical data; and
   displaying the at least one statistical data analogy and the analysis of the statistical data to the user to assist the user in understanding and using the statistical data.

2. The method of claim 1, in which determining further comprises recognizing the statistical data within the document using optical character recognition (OCR) and/or natural language processing.

3. The method of claim 1, in which establishing the frame of reference comprises:
   identifying the textual context in which the statistical data appears in a text of the document viewed by the user using a natural language processing algorithm; and
   determining whether the statistical data is related to another statistical data within the text.

4. The method of claim 1, in which generating the at least one statistical data analogy comprises applying a conceptual model to the statistical data to algorithmically determine the at least one statistical data analogy that corresponds to the statistical data according to the frame of reference established using the statistical inference model, in which the statistical inference model comprises a convolutional neural network.

5. The method of claim 1, in which displaying comprises annotating the statistical data with the at least one statistical data analogy.

6. The method of claim 5, in which generating the at least one statistical data analogy comprises providing an analysis of the determined relevance of the statistical data to other text within the document viewed by the user, in which the analysis of the statistical data comprises a similar analogy of the human injuries and/or the human fatalities.

7. The method of claim 1, in which displaying comprises highlighting each of the statistical data detected within the document viewed by the user.

8. The method of claim 1, in which displaying comprises:
   detecting a user mouse over a highlighted statistical data within the document viewed by the user; and overlaying the at least one statistical data analogy on the document viewed by the user and proximate to the highlighted statistical data within the document viewed by the user.

9. A non-transitory computer-readable medium having program code recorded thereon for statistical data clarification, the program code being executed by a processor and comprising:
   program code to determine a relevance and a textual context of a statistical data detected within a document viewed by a user;
   program code to establish, using a statistical inference model, a frame of reference for the statistical data according to the textual context and a determined relevance of the statistical data using categories and examples of statistics from content previously viewed by the user;
   program code to generate, according to the frame of reference and the categories and the examples of statistics from the content viewed by the user, at least one statistical data analogy and an analysis of the statistical data that clarifies the statistical data, in which the categories and examples of statistics comprise a likelihood ratio of a human injury and/or human fatality having equivalent odds of occurring relative to the statistical data; and
   program code to display the at least one statistical data analogy and the analysis of the statistical data to the user to assist the user in understanding and using the statistical data.

10. The non-transitory computer-readable medium of claim 9, in which the program code to determine further comprises program code to recognize the statistical data within the document using optical character recognition (OCR) and/or natural language processing.

11. The non-transitory computer-readable medium of claim 9, in which the program code to establish the frame of reference comprises:
   program code to identify the textual context in which the statistical data appears in a text of the document viewed by the user using a natural language processing algorithm; and
   program code to determine whether the statistical data is related to another statistical data within the text.

12. The non-transitory computer-readable medium of claim 9, in which the program code to generate the at least one statistical data analogy comprises program code to apply a conceptual model to the statistical data to algorithmically determine the at least one statistical data analogy that corresponds to the statistical data according to the frame of reference established using the statistical inference model, in which the statistical inference model comprises a convolutional neural network.

13. The non-transitory computer-readable medium of claim 9, in which the program code to display comprises annotating the statistical data with the at least one statistical data analogy.

14. The non-transitory computer-readable medium of claim 13, in which the program code to generate the at least one statistical data analogy comprises program code to provide an analysis of the determined relevance of the statistical data to other text within the document viewed by the user, in which the analysis of the statistical data comprises a similar analogy of the human injuries and/or the human fatalities.

15. The non-transitory computer-readable medium of claim 9, in which displaying comprises highlighting each of the statistical data detected within the document viewed by the user.

16. The non-transitory computer-readable medium of claim 9, in which displaying comprises:
   detecting a user mouse over a highlighted statistical data within the document viewed by the user; and
   overlaying the at least one statistical data analogy on the document viewed by the user and proximate to the highlighted statistical data within the document viewed by the user.

17. A system for statistical data clarification, the system comprising:
   a statistical data detection module including a context analyzer to determine a relevance and a textual context of a statistical data detected within a document viewed by a user;
   a statistical inference model to establish a frame of reference for the statistical data according to the textual context and a determined relevance of the statistical data using categories and examples of statistics from content previously viewed by the user;
   an analogy generation engine to generate, according to the frame of reference and the categories and the examples of statistics from the content viewed by the user, at least one statistical data analogy and an analysis of the statistical data that clarifies the statistical data, in which the categories and examples of statistics comprise a likelihood ratio of a human injury and/or human fatality having equivalent odds of occurring relative to the statistical data; and
   a display circuit having a display screen to display the at least one statistical data analogy and an analysis of the statistical data to the user to assist the user in understanding and using the statistical data.

18. The system of claim 17, further comprising an optical character recognition (OCR) and/or a natural language processing (NLP) to recognize the statistical data within the document viewed by the user.

19. The system of claim 18, in which the NLP is configured to identify the textual context in which the statistical data appears in a text of the document viewed by the user using a natural language processing algorithm, and to determine whether the statistical data is related to another statistical data within the text.

20. The system of claim 17, further comprising a conceptual model applied to the statistical data to algorithmically determine the at least one statistical data analogy that corresponds to the statistical data according to the frame of reference established using the statistical inference model, in which the statistical inference model comprises a convolutional neural network.

\* \* \* \* \*